Patented May 25, 1943

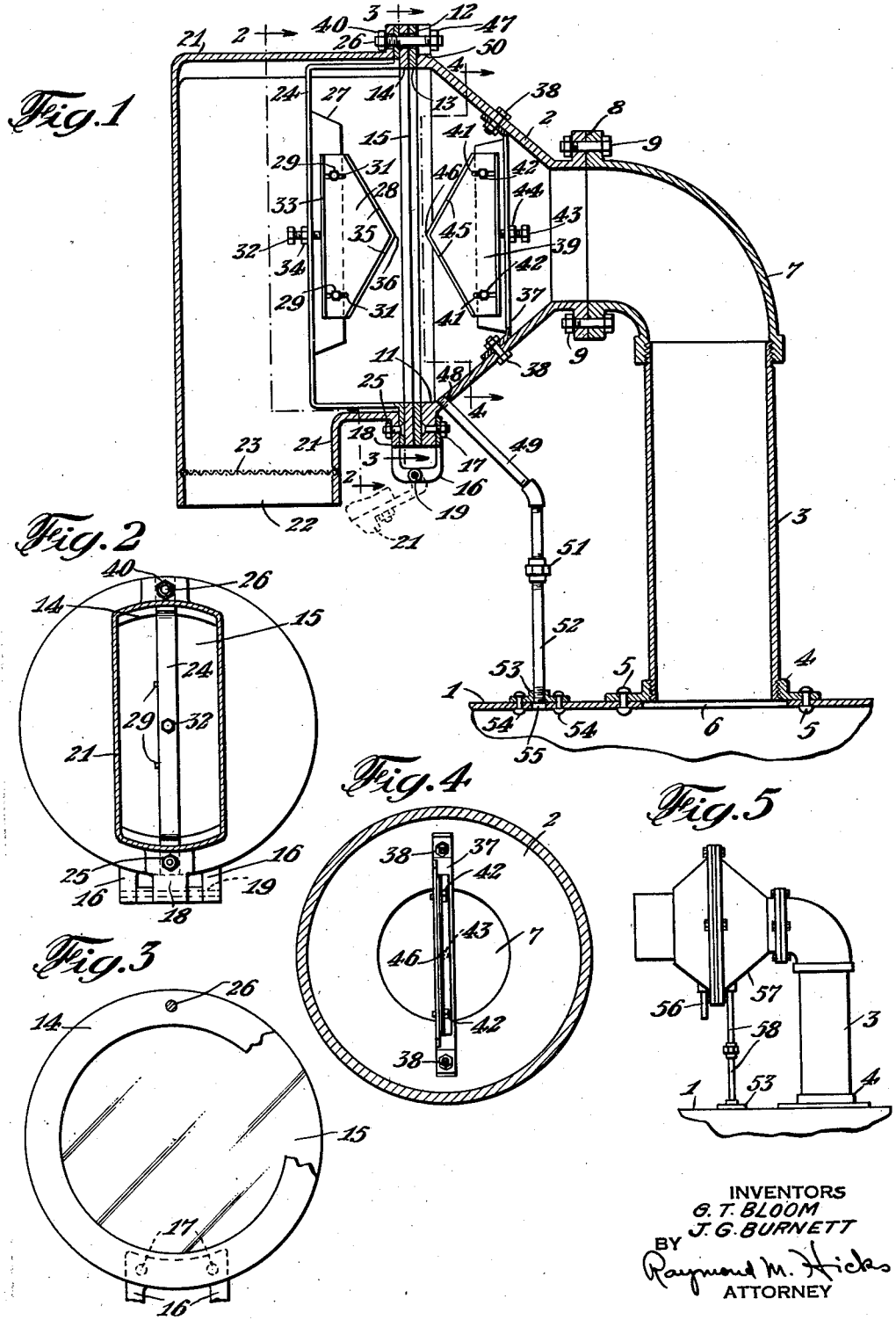

2,320,211

UNITED STATES PATENT OFFICE 2,320,211

PRESSURE RELIEF DEVICE FOR LOW PRESSURE VESSELS

George T. Bloom, Plainfield, and James G. Burnett, Jersey City, N. J.; said Burnett assignor to said Bloom Application February 15, 1941, Serial No. 379,124

3 Claims. (Cl. 220—89)

This invention relates to relief devices for protecting enclosed tanks or other vessels employed for storing fluids such as gasoline, crude petroleum and the like from the destructive effect of a relatively low pressure differential between the fluid within the tank or vessel and the ambient air.

It is well known that the pressure within an enclosed tank varies in accordance with changes in the temperature and pressure of the surrounding air and, in the case of an enclosed tank in which liquid is stored, the pressure also varies in accordance with variations in the quantity of liquid stored within the tank.

Such enclosed tanks are usually provided with vent valves adapted to be operated by the pressure differential within the tank and the atmospheric pressure surrounding the tank, an outlet valve being provided to vent the tank when the pressure within the tank exceeds the atmospheric pressure and an air intake valve for venting the tank when the pressure within the tank is less than the atmospheric pressure.

It is the general practice to install such tanks in exposed places where they are subject to variable weather conditions including freezing and below freezing temperatures and considerable difficulty has been experienced with the vent valves associated with these tanks due to the formation of a coating of frost, ice or sleet about the seat or stem of the valve, thereby sealing the valve in a closed position and rendering it unresponsive to the action of the pressure differential. It has been found that continuously falling temperatures in the case of relatively large tanks, for example, cause the intake valve to fail to open due to freezing of the valve with the result that a partial vacuum is created within the tank of sufficient degree to cause the collapse or rupture of the tank. The formation of frost, ice or sleet about the intake valve may prevent the valve from opening when the fluid stored therein is removed, which condition may also result in damage or collapse of the tank. In the case where an inlet valve has just started to open during near freezing temperatures, the moisture in the air inhaled by the tank, upon coming into contact with the chilled valve may cause the formation of ice about the valve and thus render the valve inoperative. Also, the exhalation of the tank at freezing temperatures may cause the chilled valve or valve seat to become coated with frost or ice due to the condensation of the fluid issuing from the tank and impinging upon the valve and the valve seat thereby preventing venting of the tank sufficiently to cause the tank to rupture or collapse. The collapse or rupture of a tank of relatively large proportions such, for example, as the tanks regularly employed for the storage of a volatile liquid such as raw petroleum, gasoline and the like is often accompanied by disastrous consequences.

One of the objects of the present invention is the provision of new and improved means controlled by the pressure differential between the fluid within an enclosed vessel and the air surrounding the vessel for causing a relief opening to be effective to vent the vessel.

Another of the objects of the invention resides in the provision of new and improved means for preventing the rupture of an enclosed tank by relieving the pressure differential between the interior and the exterior of the tank when a predetermined value of low degree pressure has been attained.

Another object resides in the provision of means settable at will for causing the rupture of a frangible diaphragm to vent a tank at a predetermined pressure differential between the interior and the exterior of the tank regardless of the direction of the pressure exerted upon the sides of the tank.

A further object is the provision of means for venting a tank or fluid pressure system which is reliable in operation and unaffected by freezing temperatures.

A still further object is the provision of means for preventing the accumulation of fluid vapor within the venting device in quantities sufficient to interfere with the operation of the device at freezing temperatures.

With these and other objects in view, which will become apparent from the following description of the illustrative embodiment of the invention shown on the accompanying drawing, the invention resides in the novel system, elements of construction, devices and combination of parts in cooperative relationship as hereinafter more particularly pointed out in the claims.

Referring now to the drawing in which like numerals of reference are employed to designate like parts throughout the several views, Fig. 1 is a view in elevation, partly in section, of a complete safety pressure device embodying the features of the present invention, Fig. 2 is a view, partly in section, taken along the line 2—2 of Fig. 1, Fig. 3 is a sectional view of the device of Fig 1 taken along the line 3—3 of Fig. 1, Fig. 4 is a view of the device of Fig. 1 taken along the line 4—4, and Fig. 5 is a view of a modified form of the device.

Referring now more particularly to Fig. 1 of the drawing, there is shown thereon a vessel 1 which may be the top of a storage tank or other part of a fluid pressure system that is protected by the safety device, indicated generally by the numeral 2, embodying the present invention, and which is adapted to relieve pressure either inwardly or outwardly upon the vessel or system 1 when the pressure differential between the interior of the vessel or system and the exterior thereof varies from a predetermined value.

In the illustrated embodiment shown on Fig. 1, the safety device 2 is mounted preferably upon a pipe or nipple 3 in threaded engagement with a flange 4 secured to the vessel 1 in any suitable manner as by the rivets 5 such that the nipple is in substantial alignment with an aperture 6 within the vessel. The other end of the nipple is threaded into an elbow 7 provided with a seat 8 against which the relief device is securely held as by the bolts 9.

A housing or casing 11 is adapted at 12 to be in sealed relation with a suitable gasket 13 against which is assembled a frangible member having a ring portion 14 to which is secured in any suitable manner, as by shellac or other adhesive, a frangible diaphragm 15.

The frangible diaphragm and supporting ring 14 thereof are in sealed relation with the aperture 6 whereby the diaphragm is caused to move inwardly or outwardly in accordance with the degree of pressure differential between the interior and the exterior of the vessel 1. The diaphragm is formed of any suitable elastic or ductile material adapted to stretch to a point where it ruptures when pressure is exerted thereon such, for example, as cellulose acetate, butylose rubber, rubberized fabricoid or synthetic varieties thereof, oiled silk and the like whereby the diaphragm will yield variably in either direction in response to the external and internal fluid pressures acting upon the device in varying degrees until the external and internal fluid pressure differential of the tank reaches a predetermined value, at which point the diaphragm is caused to be ruptured and sheared by one of a pair of shearing or slitting elements as will be more clearly apparent as the description proceeds.

The housing 11 also has affixed thereto a hinge member 16 securely clamped to the housing in any suitable manner as by the bolts 17. The hinge also comprises the member 18 pivotly connected to the member 16 by the pin 19. The member 18 may be separate from or, as illustrated in the drawing, integral with the housing 21 having an aperture 22 at the lower end thereof across which preferably extends a wire screen 23 to exclude insects and other foreign objects from the device while allowing free passage of the air or fluid from the tank when the device operates.

The housing 21 has secured thereto a support 24 as by the bolt 25 and stud 26, the support 24 having a portion 27 extending therefrom to which a slitting and shearing element 28 is attached by means of the bolts 29 threaded preferably into the portion 27. The slitting element is provided with two slots 31 through which the bolts 29 pass whereby the slitting or shearing element 28 may be adjustably mounted in different positions relative to the frangible diaphragm 15, an adjusting screw 32 being provided to vary at will the adjusted position of the shearing element. The adjusting screw 32 is in threaded engagement with the support 24 and is adapted to be brought into engagement with a turned up portion 33 of the shearing element. The adjusting screw 32 is maintained in any of its adjusted positions by the lock nut 34. The slitting element 28 is provided with two blades 35 disposed at an angle with each other and terminating in a point 36 in proximate relation with the central part of the frangible diaphragm 15.

The housing 11 supports a mounting 37 secured thereto as by the bolts 38 upon which is mounted the shearing and slitting element 39 provided with slots 41 through which the bolts 42 extend thus providing an arrangement whereby the slitting element 39 may be adjusted by the adjusting screw 43 in a manner similar to the slitting element 28, the adjusting screw 43 being in threaded engagement with the mounting 37 and provided with a lock nut 44 for maintaining the adjustment of the screw 43 in any of its adjusted positions. The shearing element 39 comprises two blades 45 in angular relation to each other and terminating preferably at a point 46 whereby the blades 35 and 45 may be so adjusted that the point 36 is substantially opposite the point 46 with the diaphragm 15 intermediate the two points.

The stud 26 is threaded into the support 24 whereby the support 24 and the casing 21 are securely clamped together as a unit by the nut 40. The stud 26 also extends through the ring 14, gasket 13, and housing 11 at the slotted portion 50 thereof to hold the same in alignment with each other when the nut 47 is tightened.

In operation the flexible diaphragm 15 moves inwardly and outwardly in accordance with the changes in the fluid pressure differential until sufficient fluid pressure differential is exerted against the diaphragm 15 to cause it to move into rupturing engagement with the blades 35 or 45. When this occurs, the diaphragm is ruptured and slit by the blades and the rush of air or fluid past the slit thus formed causes the diaphragm to be additionally ruptured and fractured such that no appreciable impedance is offered by the ruptured and fractured diaphragm to the free passage of air or gas whereby, when this condition occurs, the rate of relieving the pressure or partial vacuum within the vessel 1 is limited only by the size of the pipe 3.

When it is desired to replace a ruptured diaphragm, the nut 47 is removed and the housing 21 and support 24 are moved to the position indicated in dashed outline on the drawing. The ruptured diaphragm and supporting ring 14 may now be replaced by a whole diaphragm and ring assembly and the housing 21 moved back into the position indicated in solid outline on the drawing and securely clamped to the housing 11 by the nut 47 whereby the diaphragm is in sealed relation with the aperture 6 of the vessel.

In the event that it is desired to cause the diaphragm to be ruptured at a lower differential of pressure, the blades 35 and 45 are moved closer together whereby a lesser movement of the diaphragm is required to bring the diaphragm into operative engagement with the rupturing and slitting devices. Conversely, an increase in the distance between the slitting elements 35 and 45 causes the diaphragm to be moved through a greater distance and ruptured at a higher differential of pressure.

The housing 11 is provided with a threaded aperture 48 into which is fitted a drain pipe 49 provided with a union 51 for connection with the pipe 52 extending into the threaded flange 53 secured in sealed relation to the vessel 1 as by the rivets 54 and in substantial alignment with the aperture 55 thereof whereby the formation of water within the device due to condensation of water vapor, for example, is caused to flow through the drain pipe 49 and thus prevent the accumulation of water within the device which might otherwise form ice at freezing temperatures and impede the movement of the diaphragm in response to the differential external and internal fluid pressures thereagainst as the pressure differential varies.

Referring now to Fig. 5 of the drawing, there is shown thereon a pressure relief device similar to the device of Fig. 1. In the form shown on Fig. 5, the aperture having access to the atmosphere is shown in a vertical plane and in this form of the device a drain pipe 56 is provided on the external side of the diaphragm to prevent the accumulation of water and the formation of ice on the outside of the diaphragm as a result of the congealment of the water, the housing or casing 57 illustrated being similar to the housing 11 and provided with a drain pipe 58 extending into the vessel 1 in a manner similar to the arrangement of Fig. 1.

For purposes of illustration, this invention has been described in connection with a storage tank or fluid pressure system, while it is obviously not so limited, being adapted for use in various fluid pressure systems and systems for storing fluids wherein the fluid storing means is adapted to withstand relatively high fluid pressure differentials between the interior and the exterior of the system.

Also, the embodiment of the invention may take other specific forms without a departure from the spirit or principles herein described. The present embodiment is, therefore, illustrative and not restrictive, the scope of the invention being indicated by the appended claims rather than by the foregoing description, and all changes within the meaning and range of equivalency of the claims are intended to be embraced therein.

What is claimed as new and desired to be secured by U. S. Letters Patent is:

1. In a fluid pressure and vacuum relief device having a relief opening, a substantially flat frangible diaphragm yieldably responsive to varying degrees of fluid pressure thereagainst, means for supporting said diaphragm in sealed relation to said opening, a housing hinged to said supporting means, means including a pair of rupturing and shearing devices respectively arranged on said supporting means and hinged housing in proximate spaced relation on opposite sides of said diaphragm, and means for adjusting said rupturing and shearing devices to vary the degree of proximity of said shearing devices with respect to the frangible diaphragm to cause the diaphragm to be ruptured and sheared by either of said rupturing and shearing devices in accordance with a predetermined degree of fluid pressure differential exerted against the diaphragm.

2. In a fluid pressure and vacuum relief device having a relief opening, a substantially flat flangible diaphragm yieldably responsive to varying degrees of fluid pressure differential thereagainst, means including a casing for supporting said diaphragm in sealed relation to said opening, a housing hinged to said casing on the opposite side of said diaphragm from said casing, a pair of diaphragm rupturing and slitting means respectively secured to said casing and the housing, and means for adjusting the relative position of said pair of rupturing and slitting means with respect to said diaphragm to cause the diaphragm to be ruptured and slit by said rupturing and slitting means in accordance with a predetermined degree of fluid pressure differential exerted against said diaphragm.

3. In a fluid pressure and vacuum relief device of the character disclosed, a casing having a relief passage therein, a flexible disk shaped diaphragm yieldably responsive to varying degrees of fluid pressure differential thereagainst and having a ring portion sealed thereto, a housing hinged to said casing and movable at will to either an open or a closed position, said housing having a relief aperture therein, means effective when the housing is in said closed position for clamping the ring portion of the diaphragm detachably to the casing thereby to cause the diaphragm to be brought into sealed relation with said relief passage, a first diaphragm rupturing device mounted on said casing within said relief opening, a second diaphragm rupturing device mounted on said hinged housing whereby said first and second rupturing devices are disposed on opposite sides of the diaphragm and adjacent thereto when the housing is in said closed position, and means for adjusting the devices with respect to the diaphragm to cause the diaphragm to be ruptured by contact with the rupturing devices selectively when the fluid pressure differential between the relief passage and the aperture has attained a predetermined value.

GEORGE T. BLOOM.
JAMES G. BURNETT.